United States Patent Office 3,285,855
Patented Nov. 15, 1966

3,285,855
STABILIZATION OF ORGANIC MATERIAL WITH ESTERS CONTAINING AN ALKYLHYDROXY-PHENYL GROUP
Martin Dexter, Briarcliff Manor, John D. Spivack, Spring Valley, and David H. Steinberg, Bronx, N.Y., assignors to Geigy Chemical Corporation, Greenburgh, N.Y., a corporation of Delaware
No Drawing. Filed Mar. 11, 1965, Ser. No. 439,076
15 Claims. (Cl. 252—57)

This application is a continuation-in-part of copending application, Serial No. 164,618, filed January 5, 1962, which in turn is a continuation-in-part of copending application, Serial No. 148,738, filed October 30, 1961, and both now abandoned.

This invention relates to the stabilization of organic material normally subject to oxidative deterioration. In particular, the invention relates to stabilization of polypropylene with new compounds which are esters of hindered hydroxybenzoic and hydroxyphenylalkanoic acids.

More specifically, the invention pertains to a method of stabilizing polypropylene and/or other organic material normally subject to oxidative deterioration with an effective amount of an esterified hindered phenol substituted acid stabilizer represented by those of the formulae:

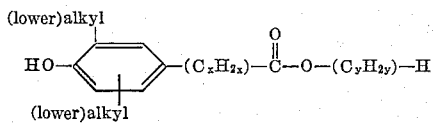

(I)

in which
x has a value of from 0 to 6, inclusively, and
y has a value of from 6 to 30, inclusively;

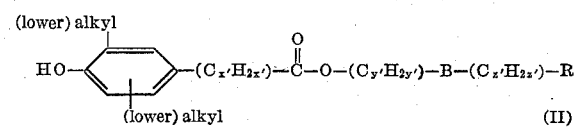

(II)

wherein
x' has a value of from 0 to 6, inclusively,
Each of y' and z' has a value of from 2 to 20, inclusively,
R is a member consisting of hydrogen, hydroxy, alkanoyloxy or

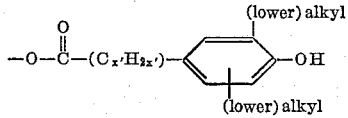

B is a member consisting of a divalent sulfur atom, a divalent oxygen atom or the group

in which
A is alkyl or alkanoyl; and

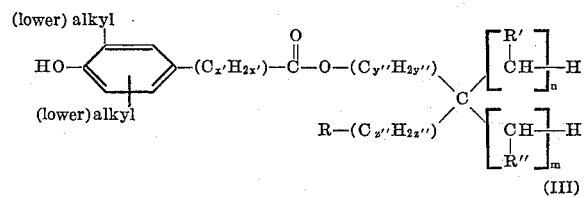

(III)

in which
R is hydrogen, hydroxy, alkanoyloxy, or

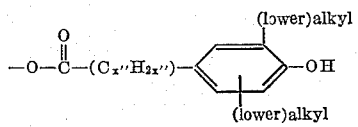

Each of R' and R" is hydroxy, alkanoyloxy or

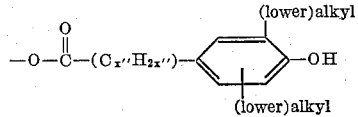

$x''$ has a value of from 1 to 6, inclusively,
Each of $y''$, $z''$, $n$ and $m$ independently has a value of from 0 to 6, inclusively, at least one of $y''$, $z''$, $n$ and $m$ having a value other than 0 and the sum of $n$ and $m$ being no greater than 6 and being at least 1 when R is hydrogen and the sum of $y''$ and $z''$ being at least 1 when R is other than hydrogen.

It is a further object of the invention to provide a novel stabilized composition of matter which comprises organic material normally subject to oxidative deterioration and a stabilizer compound defined hereinabove as Formulae I, II and III.

Materials which are stabilized according to the present invention include synthetic organic polymeric substances such as vinyl resins formed from the polymerization of vinyl halides or from the copolymerization of vinyl halides with unsaturated polymerizable compounds, e.g., vinyl esters, α,β-unsaturated acids, α,β-unsaturated esters α,β-unsaturated ketones, α,β-unsaturated aldehydes and unsaturated hydrocarbons such as butadienes and styrene; poly-α-olefins such as polyethylene, polypropylene, polybutylene, polyisoprene and the like, including copolymers of poly-α-olefins; polyurethanes such as are prepared from polyols and organic polyisocyanates; polyamides such as polyhexamethylene adipamide; polyesters such as polymethylene terephthalates; polycarbonates; polyacetals; polystyrene, polyethyleneoxide; and copolymers such as those of high impact polystyrene containing copolymers of butadiene and styrene and those formed by the copolymerization of acrylonitrile, butadiene and/or styrene. Other materials stabilized according to the present invention include lubricating oil of the aliphatic ester type, e.g., dihexyl azelate di-(2-ethylhexyl)azelate, di-(3,5,5-trimethylhexyl)glutarate, diisoamyl adipate, pentaerythritol, tetracaproate, triamyl tricarballate, dipropylene glycol dipelargonate, 1,5-pentanediol di-(2-ethylhexanoate), and the like; animal and vegetable derived oils, e.g., linseed oil, fat, tallow, lard, peanut oil, cod liver oil, castor oil, palm oil, corn oil, cotton seed oil and the like; hydrocarbon material such as gasoline, both natural and synthetic, diesel oil, mineral oil, fuel oil, drying oil, cutting fluids, waxes, resins and the like, fatty acids such as soaps; trimethylolpropane tripelargonate, EPT rubber, chlorinated rubber, natural rubber and the like.

In general, the stabilizers are employed in an amount of from about 0.005% to about 10% by weight based upon the stabilized composition. In polypropylene amounts of from about 0.01% to about 5% by weight are advantageous with from about 0.01 to about 0.5% by weight being especially preferred. In hydrocarbon oil amounts of from about 0.05% to about 5% by weight are especially useful. In high impact polystyrene 0.05% to 5% by weight of stabilizer is preferred. (All the foregoing percents by weight are based on the stabilized composition.)

With respect to compounds of Formula I, the present invention contemplates as specific embodiments methods and compositions using those of the formula:

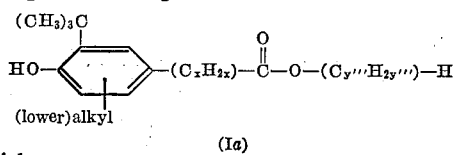

in which
x is as above defined, and
y''' has a value of from 6 to 20.

Special mention is made of the preferred species of Formula I which may be represented by the formula:

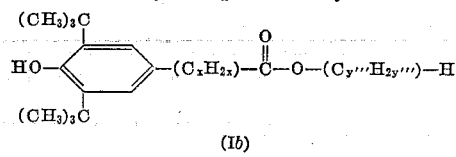

Special mention is made of methods and compositions using the following highly effective stabilizers of Formula I:

n-octadecyl 3,5-di-t-butyl-4-hydroxyphenylacetate;
n-octadecyl 3,5-di-t-butyl-4-hydroxybenzoate;
n-hexyl 3,5-di-t-butyl-4-hydroxyphenylbenzoate;
n-dodecyl 3,5-di-t-butyl-4-hydroxyphenylbenzoate;
neo-dodecyl 3-(3,5-di-t-butyl-4-hydroxyphenyl) propionate;
dodecyl β-(3,5-di-t-butyl-4-hydroxyphenyl)propionate;
ethyl α-(4-hydroxy-3,5-di-t-butylphenyl)isobutyrate;
octadecyl α-(4-hydroxy-3,5-di-t-butylphenyl)isobutyrate;
octadecyl α-(4-hydroxy-3,5-di-t-butylphenyl)propionate; and
n-octadecyl-β-(3,5-di-t-butyl-4-hydroxyphenyl) propionate.

With respect to compounds of Formula II, the present invention contemplates methods and compositions using as specific embodiments those of the formulae:

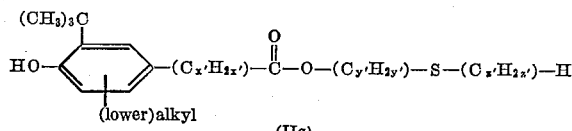

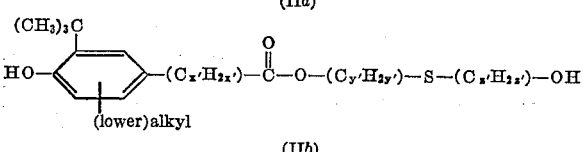

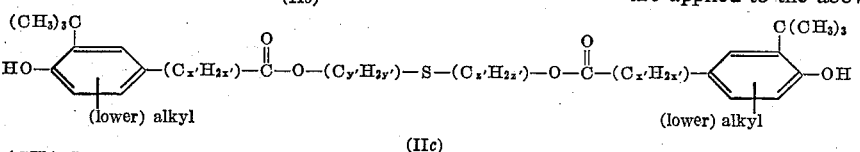

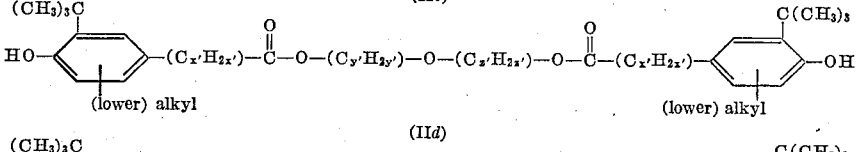

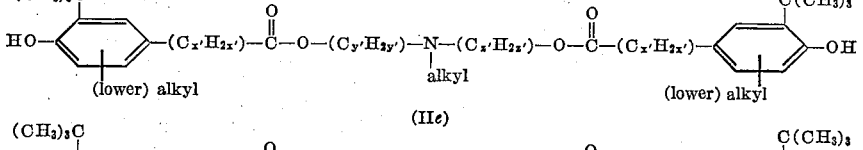

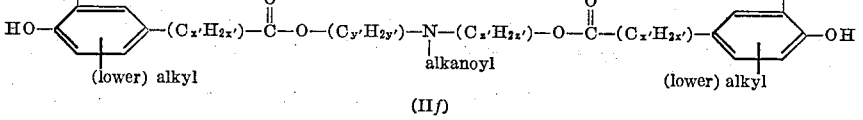

In Formulae IIa–IIf, the designation x', y' and z' have values as respectively defined for Formula II hereinabove. Particularly preferred are those compounds of Formulae IIa–IIf wherein the "(lower)alkyl" groups are t-butyl groups in the position ortho to the phenolic hydroxy group.

Special mention is made of methods and compositions using the following highly effective stabilizers of Formula II:

2-(n-octylthio)ethyl 3,5-di-t-butyl-4-hydroxybenzoate;
2-(n-octylthio)ethyl 3,5-di-t-butyl-4-hydroxyphenylacetate;
2-(n-octadecylthio)ethyl, 3,5-di-t-butyl-4-hydroxy phenylacetate;
2-(n-octadecylthio)ethyl 3,5-di-t-butyl-4-hydroxybenzoate;
2-(2-hydroxyethylthio)ethyl 3,5-di-t-butyl-4-hydroxybenzoate;
β,β-thiodiethyl bis-(3,5-di-t-butyl-4-hydroxyphenylacetate);
diethylene glycol bis-[3-(3,5-di-t-butyl-4-hydroxyphenyl) propionate];
2-(n-octadecylthio)ethyl 3-(3,5-di-t-butyl-4-hydroxyphenyl)propionate;
thio-bis-[ethylene 3-(3,5-di-t-butyl-4-hydroxyphenyl) propionate];
n-butylimino N,N-bis-[ethylene-3-(3,5-di-t-butyl-4-hydroxyphenyl)propionate];
2-(2-stearoyloxyethylthio)ethyl 3,5-di-t-butyl-4-hydroxybenzoate;
2-(2-hydroxyethylthio)ethyl 7-(3-methyl-5-t-butyl-4-hydroxyphenyl)heptanoate; and
2-(2-stearoyloxyethylthio)ethyl 7-(3-methyl-5-t-butyl-4-hydroxyphenyl)heptanoate.

With respect to compounds of Formula III, these are mono and polyesters of alkanepolyols. These polyols, from which the compounds of the present invention are prepared, may be represented as follows:

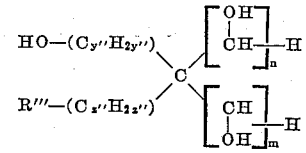

in which y'', z'', n and m as defined above in Formula III and R''' is either hydrogen or hydroxy.

The following table, in which typical alkanepolyols are applied to the above formula, will further clarify the

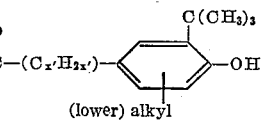

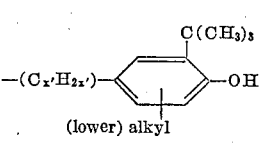

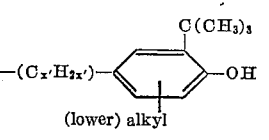

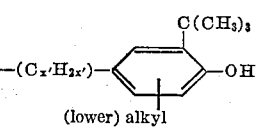

nature of these polyols. The specific polyols given are merely representative and not limitative.

| Alkanepolyol | $y''$ | $z''$ | $m$ | $n$ | $R'''$ |
|---|---|---|---|---|---|
| Ethylene glycol | 0 | 0 | 0 | 1 | —H |
| 1,2-propanediol | 0 | 1 | 0 | 1 | —H |
| 1,3-propanediol | 1 | 0 | 0 | 1 | —H |
| 1,4-butanediol | 2 | 0 | 0 | 1 | —H |
| 1,6-hexanediol | 4 | 0 | 0 | 1 | —H |
| 1,2-octanediol | 0 | 6 | 0 | 1 | —H |
| 1,7-heptanediol | 5 | 0 | 0 | 1 | —H |
| 1,2,3-butanetriol | 0 | 1 | 0 | 2 | —H |
| Glycerol | 0 | 0 | 1 | 1 | —H |
| Neopentyl glycol | 0 | 4 | 0 | 0 | —H |
| Erythritol | 0 | 0 | 0 | 3 | —H |
| Pentaerythritol | 1 | 1 | 1 | 1 | —H |
| Sorbitol | 1 | 0 | 0 | 4 | —OH |
| 2,5-hexanediol | 3 | 2 | 0 | 0 | —OH |
| 1,1,1-trimethylolpropane | 1 | 2 | 1 | 1 | —H |
| 2,2,4-trimethyl-1,3-pentanediol | 0 | 6 | 0 | 0 | —OH |

The compounds of Formula III of the present invention are mono and polyesters of such alkanepolyols, at least one of such ester groups comprising the acyl moiety:

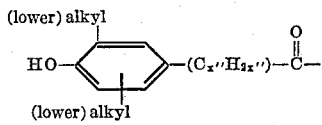

in which $x''$ has a value of from 1 to 6 and preferably 2.

Each of the remaining hydroxy groups of the particular alkanepolyol may be unesterified, esterified by the said acyl group, or esterified by alkanoyl groups of from 1 to 20 carbon atoms.

Preferred compounds of Formula III for the present invention include those fully esterified compounds wherein all the hydrogen atoms on all the hydroxy groups of these polyols, e.g., ethylene glycol, pentaerthritol, sorbitol, 1,1,1-trimethylolpropane, etc., are replaced by the said acyl moiety represented above.

Among the other preferred compounds of Formula III of the present invention are those of the formulae:

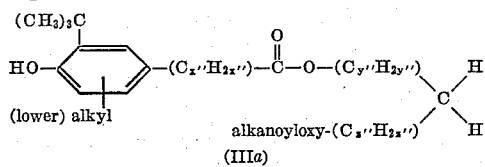

(IIIa)

In Formulae IIIa and in IIIb and IIIc, below, $x''$, $y''$, and $z''$ have a value as defined above for III. In Formula IIIc, $q$ has a value of from 0 to 5.

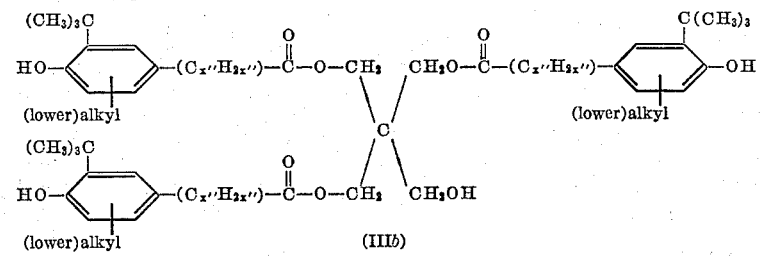

(IIIb)

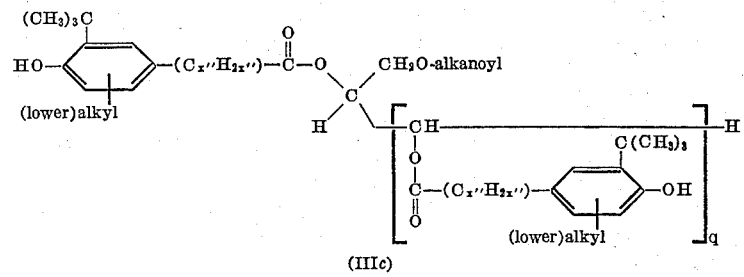

(IIIc)

Special mention is made of methods and compositions using the following highly effective stabilizers of Formula III: 1,2-proplyene glycol bis-[3-(3,5-di-t-butyl-4-hydroxyphenyl)-propionate]; ethylene glycol bis-[3-(3,5-di-t-butyl-4-hydroxyphenyl)propionate]; neopentylglycol bis-[3-(3,5-di-t-butyl-4-hydroxyphenyl)propionate]; ethylene glycol bis - (3,5 - di - t - butyl - 4 - hydroxyphenylacetate); glycerine-1-n-octadecanoate - 2,3 - bis - (3,5-di-t-butyl-4-hydroxyphenylacetate); tetra-[methylene 3-(3,5-di-t-butyl-4- hydroxyphenyl)propionate]methane; n-propyl 1,1,1-tris - [methylene 3 - (3,5-di-t-butyl-4-hydroxyphenyl) propionate]; sorbitol hexa-[3(3,5-di-t-butyl-4-hydroxyphenyl)propionate]; 1,2,3-butanetriol tris -[3-(3,5-di-t-butyl-4 - hydroxyphenyl)propionate]; 2 - hydroxyethyl 7 - (3 - methyl-5-t-butyl-4-hydroxyphenyl)heptanoate; 2 - stearoyloxyethyl 7 - (3-methyl-5-t-butyl-4-hydroxyphenyl)heptanoate; and n-ethyl 1,1,1 - tris[methylene 3-(3,5-di-t-butyl-4-hydroxyphenyl)propionate].

In this specification and in the appended claims, by the term "alkyl" and derivations thereof such as "alkylene" or "alkanoyl" is intended as a group containing a branched or straight chain hydrocarbon chain of from 1 to 20 carbon atoms inclusively. Representative of such alkyl groups are thus methyl, ethyl, propyl, butyl, t-butyl, octyl, decyl, dodecyl, tetradecyl, octadecyl, eicosyl and the like.

When the term "alkyl" is herein qualified by the designation "(lower)," there is intended a branched or straight chain hydrocarbon of from 1 to about 6 carbon atoms.

It will be observed, that the di(lower)alkylphenol moiety in Formulae I–III and embodiments thereof, exhibits at least one (lower)alkyl group in a position ortho to the hydroxy group. The other (lower)alkyl group is either (a) in the other position ortho to the hydroxy group or (b) meta to the hydroxy group and para to the first (lower)alkyl group. Although not so limited, these (lower)alkyl groups are preferably branched such as t-butyl. Other arrangements, such as for example a 3-t-butyl-6-methyl-p-phenolic moiety, are however, clearly envisioned.

The compounds used in the present invention may be prepared via usual esterification procedure from a suitable alcohol and an acid of the formula:

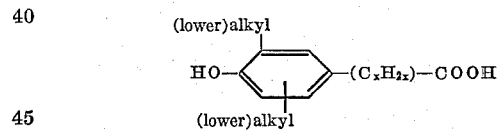

or an acid halide, acid anhydride or mixed anhydride thereof.

Similarly the novel esters used in this invention may be prepared by conventional methods of transesterification. Especially useful as a reagent for this purpose is methyl-β(3,5-di-t-butyl-4-hydroxyphenyl)propionate.

The preparation of numerous novel compounds of Formula I and embodiments embraced thereby is exemplified in detail in applicants' copending application, Serial No. 354,434, filed on March 24, 1964, in which they are claimed.

Similarly the novel esters of this invention of Formula II may be prepared by conventional methods of esterification or of transesterification as well as by treatment of an acid of the formula:

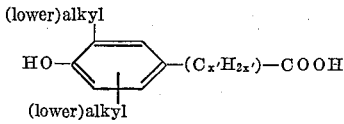

under basic conditions with a halogen compound of the formula:

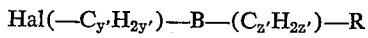

in which B, R, $y'$ and $z'$ are as defined above and Hal is a halogen atom, e.g., chloro or bromo.

The preparation of numerous novel compounds of Formula II and embodiments embraced thereby is exemplified in detail in applicants' copending application, Serial No. 354,464, filed March 24, 1964.

Similarly the novel esters of Formula III used in this invention may be prepared by conventional methods of esterification or of transesterification, and preferably are prepared from the partial alkanoic acid esters of the particular polyol by further partial or complete esterification with an acid of the above formula or a reactive derivative thereof such as its acid chloride or anhydride. Alternatively a glycol partially esterified by the acyl moiety may be further esterified by alkanoic acid or derivative thereof.

The preparation of numerous novel compounds of Formula III and embodiments embraced thereby is exemplified in detail in applicants' copending application, Serial No. 359,460, filed April 13, 1964.

The stabilizers employed in this invention may be used alone or in combination with other stabilizers or additive materials. Especially useful in certain cases is the stabilizer di-lauryl-beta-thiodipropionate. Special mention is made of di-stearyl-beta-thiodipropionate.

Furthermore, compounds of the formula:

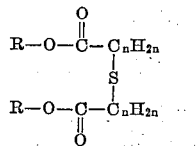

wherein
R is an alkyl group having from 6 to 24 carbon atoms; and
$n$ is an integer from 1 to 6,
are useful stabilizers in combination with the compounds of the Formulae I, II and III of the invention.

Other antioxidants, antiozidants, thermal stabilizers, ultraviolet light absorbers, coloring materials, dyes, pigments, metal chelating agents, etc. may also be used in the methods and compositions of the invention.

In this specification the term "stabilization" includes protection not merely against oxidative degradation but also protection against deterioration caused by thermal effects, visible and/or ultraviolet radiation, etc. Thus the stabilizers of the invention are contemplated as acting to protect unstable materials not only against oxidative deterioration but also against other types of deterioration such as thermal degradation or degradation caused by visible and/or ultraviolet light.

A particularly valuable class of organic materials contemplated to be stabilized by the methods and compositions of the present invention are those of the group consisting of polypropylene, polyethylene, polystyrene, high impact polystyrene, aliphatic aldehydes, aliphatic ester lubricants, fats, oils of animal origin, oils of vegetable origin, hydrocarbons boiling in the gasoline range, mineral oil, hydrocarbon wax, poly(vinyl chloride) resins, polyurethanes, polyesters, polyamides and fatty acids or rubbers, natural and synthetic such as EPT, and the like.

The compositions are prepared by a number of means, depending on the substrate. For example, the instant stabilizers can be mixed into liquid substrates and can be milled into thermoplastic substrates. For addition to varnishes, the stabilizer can be dissolved in a co-solvent and this added to the varnish. As mentioned hereinbefore and exemplified hereinafter, levels of the stabilizers in the substrate may vary considerably depending on particular end application, degree of protection desired, variations in the substrate, and presence of synergizing stabilizers (ultraviolet absorbers, phosphites, dialkyl thiodipropionates, and the like). Ordinarily, selecting the proper use level is well within the capabilities of those skilled in the art.

Addition of the instant stabilizers imparts little or no color to most substrates and, after formulation, they are characterized by substantial ability to retain good color under processing conditions and weathering.

The instant invention provides polyolefin compositions protected against thermal and oxidative degradation during processing. It provides minimized melt-flow drift, and extends the service life of finished articles. Particularly noteworthy are the instant compositions' excellent color retention under prolonged oven or light exposure, and their resistance to extraction by boiling water and alkaline detergents and to attack by hypochlorite. The polyolefin compositions of the instant invention are especially useful in hot air ducts, in hot water heaters, in washing machine parts, in bottles, in beverage cases, and the like.

As will be exemplified, there are provided polyethylene compositions with excellent oxidative stability and good resistance against degradation during extrusion, as measured by stabilization of melt flow at 260° C. and by retention of physical properties on repeated extrusion.

This invention provides polyamide compositions with improved stability, as measured by retention of tensile strength at 100° C., and retarded yellowing as measured on Fadeometer exposure tests. Compositions are contemplated which provide for stabilized color and viscosity in hot melt polyamide adhesives.

This invention provides coating compositions which inhibit the yellow discoloration of acid catalyzed urea/formaldehyde-alkyd, force-dry furniture varnishes. Especially effective as a use level is 0.2% by weight of stabilizer based on varnish solids. Also contemplated are nitrocellulose and polyurethane coating compositions with improved color-aging properties and durability.

This invention affords a means to obtain acrylonitrile-butadiene-styrene (ABS) resin compositions with improved resistance to discoloration as determined by oven aging at 120° C. and exposure in a press at 450° F.

The stability of polyurethane exposed to fluorescent sunlamps, black lights, and fluorescent lights is improved by compounding it in accordance with this invention.

Stearic acid compounded according to this invention retains good color under alkaline conditions such as are found in preparing soap from stearic acid.

The instant process is also of substantial use to stabilize modified polystyrenes, acrylics, and impact modified acrylics.

All of the foregoing objects are readily achieved through application of the methods and compositions taught hereinbefore and the specific embodiments thereof which are, in essence:

The method of stabilizing compounds wherein the stabilizer is defined by Formula III hereinabove.

The method of stabilizing compounds wherein the organic stabilizer is defined by Formula II hereinabove.

The method of stabilizing compounds wherein the stabilizer is defined by Formula III ehreinabove.

A stabilized composition of matter stabilized against deterioration which comprises organic material normally subject thereto and a stabilizer according to Formulae I–III, inclusive, hereinabove.

A stabilized composition of matter stabilized against deterioration which comprises organic material normally subject thereto and a stabilizer defined by Formula I hereinabove.

A stabilized composition of matter stabilized against deterioration which comprises organic material normally subject thereto and a stabilizer defined by Formula II hereinabove.

A stabilized composition of matter stablized against deterioration which comprises organic material normally subject thereto and a stabilizer defined by Formula III hereinabove.

A composition of matter stabilized against deterioration which comprises organic material normally subject thereto, a stabilizer of Formulae I–III hereinabove and di-alkyl-β-thiodipropionate.

The method of stabilizing organic material defined hereinabove wherein said organic material comprises polypropylene.

The method of stabilizing organic material defined hereinabove wherein said organic material comprises mineral oil.

The method of stabilizing organic material defined hereinabove wherein said organic material comprises high impact polystyrene.

A stabilized composition of matter which comprises polypropylene and stabilizers of Formulae I–III hereinabove.

A stabilized composition of matter which comprises mineral oil and the stabilizers of Formulae I–III hereinabove.

A stabilized composition of matter which comprises high impact polystyrene and stabilizers of Formulae I–III hereinabove.

A stabilized composition of matter which comprises polypropylene and n-octadecyl 3,5-di-t-butyl-4-hydroxyphenylacetate.

A stabilized composition of matter which comprises polypropylene and n-octadecyl β-(3,5-di-t-butyl-4-hydroxyphenyl)propionate.

A stabilized composition of matter which comprises polypropylene and 2-(n-octylthioethyl)-3-,5-di-t-butyl-4-hydroxyphenylacetate.

A stabilized composition of matter which comprises polypropylene and 2 - (n - octadecylthioethyl)-3-,5-di-t-butyl-hydroxybenzoate.

A stabilized composition of matter which comprises polypropylene and 2 - (n-octadecylthioethyl)-3(3,5-di-t-butyl-4-hydroxy)propionate.

A stabilized composition of matter which comprises polypropylene and tetra-[methylene 3-(3,5-di-t-butyl-4-hydroxyphenyl)-propionate]-methane.

A stabilized composition of matter which comprises polypropylene and ethyl 1,1,1-tris-[methylene 3-(3,5-di-t-butyl-4-hydroxyphenyl)-propionate].

The following examples are illustrative of the invention only, and there is no intention to limit the scope of the invention thereto. In the following examples parts are by weight, unless otherwise specified, and temperatures are in degrees centigrade. The relationship between parts by weight and parts by volume is as grams to cubic centimeters.

EXAMPLE 1

Unstabilized polypropylene powder (Hercules Profax 6501) is thoroughly blended with 0.5% by weight of 2-(n - octadecylthioethyl) - 3,5 - di - t - butyl - 4 - hydroxyphenylacetate, made according to Example 3 of Serial No. 354,464. The blended material is then milled on a two roller mill at 182° for 5 minutes, after which time the stabilized polypropylene is sheeted from the mill and allowed to cool.

The milled polypropylene sheet is then cut into small pieces and pressed for 7 minutes on a hydraulic press at 218° and 2000 pounds per square inch pressure. The resultant sheet of 25 mil thickness is then tested for resistance to accelerated aging in a forced draft oven at 149°. The resultant composition of 0.5% by weight of 2 - (n - octadecylthioethyl) - 3,5 - di - t - butyl - 4 - hydroxyphenylacetate and polypropylene is stabilized against oxidative deterioration for 1000 hours. The unstabilized polypropylene deteriorates after only 3 hours.

The procedure is repeated substituting respectively, for the 0.5% weight concentration, 0.1% and 1.0%. Effectively stabilized compositions of polypropylene are obtained.

EXAMPLE 2

The procedure of Example 1 is repeated substituting for the 2 - (n - octadecylthioethyl) - 3,5 - di-t-butyl-4-hydroxyphenylacetate equal weights of 2-(n-octadecylthio)ethyl 3 - (3,5 - di - t - butyl - 4 - hydroxyphenyl) - propionate. A stabilized polypropylene composition with very marked resistance to long high temperature exposures is obtained (oven life, 1220 hours).

EXAMPLE 3

The procedure of Example 1 is repeated substituting for the 2 - (n - octadecylthioethyl) - 3,5 - di-t-butyl-4-hydroxyphenylacetate, equal weights of the following tabulated compounds, prepared as described in the parenthetically indicated examples of Serial No. 354,464:

2-(n-octylthio)ethyl 3,5-di-t-butyl-4-hydroxybenzoate (Ex. 1) (oven life, 20 hours)

2-(n-octylthio)ethyl 3,5-di-t-butyl-4-hydroxyphenylacetate (Ex. 2) (oven life, 20 hours)

2-(n-octadecylthio)ethyl 3,5-di-t-butyl-4-hydroxybenzoate (Ex. 4) (oven life, 740 hours)

2-(2-hydroxyethylthio)ethyl 3,5-di-t-butyl-4-hydroxybenzoate (Ex. 5) (oven life, 15 hours)

β,β-Thiodiethyl bis-(3,5-di-t-butyl-4-hydroxyphenylacetate) (Ex. 6) (oven life, 460 hours)

Diethylene glycol bis-[3-(3,5-di-t-butyl-4-hydroxyphenyl)-propionate] (Ex. 7) (oven life, 1000 hours)

Thio-bis-[ethylene 3-(3,5-di-t-butyl-4-hydroxyphenyl)-propionate] (Ex. 10) (oven life, 1350 hours)

n - Butylimino N,N - bis - [ethylene 3-(3,5-di-t-butyl-4-hydroxyphenyl)-propionate] (Ex. 11) (oven life, 1150 hours)

2-(2-stearoyloxyethylthio)-ethyl 3,5-di-t-butyl-4-hydroxybenzoate (Ex. 12)

2-(2-hydroxyethylthio)-ethyl 7-(3-methyl-5-t-butyl-4-hydroxyphenyl)-heptanoate (Ex. 13)

2 - (2-stearolyethylthio)-ethyl 7-(3-methyl-5-t-butyl-4-hydroxyphenyl)-heptanoate (Ex. 13)

Stabilized compositions of polypropylene with prolonged resistance to high temperatures are obtained.

EXAMPLE 4

A composition is prepared from unstabilized polypropylene powder according to the procedure of Example 1 substituting for the 2-(n-octadecylthioethyl) 3,5-di-t-butyl-4-hydroxyphenylacetate equal weights of octadecyl-β-(3,5-di-t-butyl-4-hydroxyphenyl)propionate prepared as described in Example 4 of Serial No. 354,434. A composition with very marked resistance to deterioration under the influence of high temperature is obtained (oven life, 630 hours).

EXAMPLE 5

Polypropylene compositions are prepared according to the procedure of Example 1 substituting for the 2-(n-octadecylthioethyl) - 3,5 - di - t - butyl - 4 - hydroxyphenylacetate, equal amounts by weight of the following compounds prepared as described in the parenthetically indicated examples of Serial No. 354,434:

n-Octadecyl 3,5-di-t-butyl-4-hydroxyphenylacetate (Ex. 2)

n-Octadecyl 3,5-di-t-butyl-4-hydroxybenzoate (Ex. 3) (oven life, 15 hours)

n-Hexyl 3,5-di-t-butyl-4-hydroxyphenylbenzoate (Ex. 5) (oven life, 7 hours)

n-Dodecyl 3,5-di-t-butyl-4-hydroxyphenylbenzoate (Ex. 6) (oven life, 30 hours)

Neo-dodecyl 3 - (3,5-di-t-butyl-4-hydroxyphenyl)propionate (Ex. 7) (oven life, 30 hours)

Dodecyl β - (3,5 - di - t-butyl-4-hydroxyphenyl)propionate (Ex. 9) (oven life, 130 hours)

Ethyl α-(4-hydroxy-3,5-di-t-butylphenyl)isobutyrate (Ex. 10) (oven life, 7 hours)

Octadecyl α - (4-hydroxy-3,5-di-t-butylphenyl)isobutyrate (Ex. 13) (oven life, 115 hours)

Octadecyl α - (4-hydroxy-3,5-di-t-butylphenyl)propionate (Ex. 14) (oven life, 145 hours)

Octadecyl β-(3-n-hexyl-4-hydroxy-5-t-butylphenyl)propionate (Ex. 4)

n-Tetracosyl 3,5-di-t-butyl-4-hydroxyphenylbenzoate (Ex. 5)

Stabilized polypropylene compositions with marked resistance to deterioration at high temperatures are obtained.

EXAMPLE 6

A composition is prepared from unstabilized polypropylene powder according to the procedure of Example 1 substituting for the 2-(n-octadecylthioethyl)-3,5-di-t-butyl-4-hydroxyphenylacetate equal weights of tetra-[methylene 3 - (3,5 - di - t - butyl-4-hydroxyphenyl)propionate] methane prepared as described in Example 6 of Serial No. 359,460. A composition with very marked resistance to deterioration under the influence of high temperature is obtained. It has an oven aging life of 1470 hours. A similar composition containing 0.1% of the said methane antioxidant and 0.5% by weight of dilaurylthio dipropionate has an oven aging life of 975 hours.

Example 7

Polypropylene composition are prepared according to the procedure of Example 1 substituting for the 2-(n-octadecylthioethyl) - 3,5-di-t-butyl - 4 - hydroxyphenylacetate equal amounts by weight of the following compounds prepared as described in the parenthetically indicated examples of Serial No. 359,460:

1,2 - propylene glycol bis - [3 - (3,5-di-t-butyl-4-hydroxyphenyl)propionate] (Ex. 1) (oven life, 780 hours)

Ethylene glycol bis - [3-(3,5-di-t-butyl-4-hydroxyphenyl)-propionate] (Ex. 2) (oven life, 820 hours)

Neopentylglycol bis - [3 - 3,5-di-t-butyl-4-hydroxyphenyl)-propionate] (Ex. 3) (oven life, 510 hours)

Ethylene glycol bis - (3,5-di-t-butyl-4-hydroxyphenylacetate) (Ex. 4) (oven life, 475 hours)

Glycerine - 1-n-octadecanoate-2,3-bis-(3,5-di-t-butyl-4-hydroxyphenylacetate) (Ex. 5) (oven life, 7 hours)

n-Propyl 1,1,1, - tris - [methylene 3-(3,5-di-t-butyl-4-hydroxyphenyl)propionate] (Ex. 7) (oven life, 1750 hours)

Sorbitol hexa-[3-(3,5-di-t-butyl-4-hydroxyphenyl)propionate] (Ex. 8)

1,2,3-butanetriol tris-[3-(3,5-di-t-butyl-4-hydroxyphenyl) propionate] (Ex. 9)

2-hydroxyethyl 7 - (3-methyl-5-t-butyl-4-hydroxyphenyl) heptanoate (Ex. 10)

2 - stearoyloxyethyl 7-(3-methyl-5-t-butyl-4-hydroxyphenyl)heptanoate (Ex. 11)

Stabilized compositions of polypropylene with prolonged resistance to high temperatures are obtained.

EXAMPLE 8

A water-white, refined (U.S.P. grade) mineral oil (Esso Primol D) is stabilized for over 11 hours under the following test conditions, the unstabilized mineral oil failing after 1.8 hours.

A 10 gram sample of mineral oil is placed in a Sligh type oxidation flask filled with oxygen at room temperature (25°) and atmospheric pressure. Thereafter, the flask is sealed to form a system having a mercury manometer which measures the pressure changes as oxygen is absorbed by the sample in the flask. The sample is then heated at 150° until the manometer registers a decrease of 300 mm. Hg pressure within the flask with reference to the maximum pressure obtained at 150°. The stabilized mineral oil contains 0.1% by weight of n-octadecyl 3,5-di-t-butyl-4-hydroxyphenylacetate. The unstabilized mineral oil contains no stabilizer.

In a similar manner, stable compositions of mineral oil are prepared, one with 0.1% by weight of n-octadecyl 3,5-di-t-butyl-4-hydroxybenzoate, one with 0.1% by weight of n-octadecyl β-(3,5-di-t-butyl-4-hydroxyphenyl) propionate, one with 0.1% by weight of 2-(n-octadecylthioethyl) - β - (3,5-di-t-butyl-4-hydroxyphenyl)-propionate, and one with 0.1% by weight of tetra-[methylene 3-(3,4-di-t-butyl-4-hydroxyphenyl)propionate]methane.

EXAMPLE 9

High impact polystyrene resin containing elastomer (i.e. butadiene-styrene) (Foster Grant, XI1516, unstabilized) is stabilized against loss of elongation properties by incorporation of 0.5% by weight of a stabilizer (Table I). Under the test conditions described hereinbelow, the stabilized resin retains from 50 to 65% of its original elongation properties, whereas the unstabilized resin retains only 15% of its elongation properties.

The unstabilized resin is dissolved in chloroform and the stabilizer then added, after which the mixture is cast on a glass plate and the solvent evaporated to yield a uniform film, which, upon drying, is removed and cut up and then pressed for 7 minutes at a temperature of 163° and a pressure of 2000 pounds per square inch into a sheet of uniform thickness (25 mils). The sheets are then cut into strips, approximately 4 x 0.5 inches. A portion of these strips is then measured for length of elongation in the Instron Tensile Tester (Instron Engineering Corporation, Quincy, Massachusetts). The remaining portion of the strips is aged in a forced draft oven for 6 weeks at 75° and thereafter tested for elongation.

Table I below shows several stabilized resins compared with unstabilized resins.

*Table I*

| Stabilizer Compound | Percent Elongation Retained | Stabilization Factor (Improvement over Blank) |
|---|---|---|
| n-Octadecyl 3,5-di-t-butyl-4-hydroxybenzoate | 65 | 4.3 |
| n-Octadecyl β-(3,5-di-t-butyl-4-hydroxyphenyl) propionate | 65 | 4.3 |
| 2-(n-octylthioethyl) 3,5-di-t-butyl-4-hydroxybenzoate | 50 | 3.3 |
| Blank (no stabilizer) | 15 | 1 |

By the same procedure, stable compositions are obtained, one with 0.5% by weight of 2-(n-octadecylthioethyl)-β-(3,5-di-t-butyl-4-hydroxyphenyl)propionate, and one with 0.5% by weight of tetra-[methylene-3-(3,5-di-t-butyl-4-hydroxyphenyl)propionate]methane.

EXAMPLE 10

Stabilized compositions are prepared according to the procedure of Example 1 using the esters of hindered acids of Examples 1–7, inclusive and adding to the compositions 0.5% by weight of distearylthio-dipropionate. In some cases the improvement in stability to high temperature deterioration is so remarkable that a synergistic effect is observed in the oven-aging test.

EXAMPLE 11

A stabilized polypropylene composition is prepared according to the procedure of Example 1 substituting for the 2-(n-octadecylthioethyl)3,5-di-t-butyl-4-hydroxyphenylacetate an equal weight of ethyl 1,1,1-tris-[methylene 3-(3,5-di-t-butyl-4-hydroxyphenyl)propionate] prepared as described in Example 7 of Serial No. 359,460, filed April 13, 1964, substituting trimethylolethane for trimethylol propane. A stabilized composition of matter with marked resistance to deterioration at high temperature is obtained (oven life, 1750 hours).

EXAMPLE 12

A composition of linear polyethylene is prepared by intimately mixing therein 150 parts per million (p.p.m.) by weight of n-octadecyl β-(3,5-di-t-butyl-4-hydroxyphenyl)-propionate. This composition is injection molded into tensile bars which are placed in a circulating air oven at 120° C. In contrast with a loss of all tensile strength in 2 weeks in control bars containing polyethylene and 150 p.p.m. of butylated hydroxytoluene, a commercial antioxidant, the instant composition retains nearly its tensile strength for at least 10 weeks.

Similar compositions of linear polyethylene with high oxidation stability are prepared with 150 p.p.m. by weight respectively of 2-(n-octadecylthioethyl)-3-(3,5-di-t-butyl-4-hydroxyphenyl)propionate and tetra-[methylene 3-(3,5-di-t-butyl-4-hydroxyphenyl)propionate]methane.

EXAMPLE 13

A composition is prepared comprising nylon 6 polyamide and 0.5% by weight of n-octadecyl β-(3,5-di-t-butyl-4-hydroxyphenyl)propionate. In contrast to those molded from unstabilized nylon 6, tensile bars molded from the instant composition retain their strength for substantially longer periods at 100° C., and yellowing is retarded as measured by Fadeometer exposure.

EXAMPLE 14

A polyvinyl chloride composition comprising 100 parts of vinyl chloride resin (Goodyear Geon 103 EP), 2 parts of dibutyltin maleate and 0.5 part of stearic acid is molded into plaques and exposed to 180° C., in an air circulating oven. This composition becomes yellow at 160 minutes and black at 200 minutes. In contrast when there is added to a composition as above 0.1% by weight of n-octadecyl β-(3,5-di-t-butyl-4-hydroxyphenyl)propionate the plaques remain clear even after 220 minutes in the oven.

In a similar manner stabilized polyvinyl chloride compositions are prepared with 0.1% by weight respectively of 2-(n-octadecylthioethyl)-3-(3,5-di-t-butyl-4-hydroxyphenyl)propionate and tetra-[methylene 3-(3,5-di-t-butyl-4-hydroxyphenyl)-propionate]methane.

EXAMPLE 15

A light stabilized crystal polystyrene is exposed to black light for 1750 hours and the percent transmission at 420 mμ drops to 75.3%, while the control drops to 49.4%. Addition of 0.05% of n-octadecyl β-(3,5-di-t-butyl-4-hydroxyphenyl)-propionate provides an improved composition with 78.6% transmission under the same conditions. Similarly, polystyrene compositions with improved color retention after black light exposures are obtained when there are incorporated therein, respectively, 0.05% by weight of 2-(n-octadecylthioethyl)-3-(3,5-di-t-butyl-4-hydroxyphenyl)propionate and tetra-[methylene 3-(3,5-di-t-butyl-4-hydroxyphenyl)propionate]methane.

EXAMPLE 16

Coating compositions with improved color-aging properties and resistance to yellow discoloration are prepared by incorporating, respectively, 0.2% based on varnish solids of n-octadecyl β-(3,5-di-t-butyl-4-hydroxyphenyl) propionate into a urea/formaldehyde-alkyd resin varnish and a nitrocellulose lacquer.

EXAMPLE 17

A composition comprising an acrylonitrile-butadiene-styrene terpolymer and 0.5% by weight of n-octadecyl β-(3,5-di-t-butyl-4-hydroxyphenyl)propionate resists discoloration at 120° C. longer than one which does not contain the stabilizer.

A composition comprising polyurethane and 1.0% by weight of n-octadecyl β-(3,5-di-t-butyl-4-hydroxyphenyl)-propionate is more stable under fluorescent sunlamps, black lights and fluorescent lights than the unformulated polyurethane. A stearic acid composition is prepared containing 0.5% by weight of n-octadecyl β-(3,5-di-t-butyl-4-hydroxyphenyl)propionate. This retains good color under hot alkaline conditions. In contrast, unmodified stearic acid develops poor color during alkaline conditioning under conditions substantially those employed to make soap.

Specifically, a composition comprising ABS resin and 1% calcium stearate develops a Hunter L–b whiteness value of 40.6 after milling for 1 hour at 400° F., while composition comprising ABS resin with 0.5% by weight of the said propionate and 0.5% by weight of distearylthiodipropionate and calcium stearate developes a Hunter whiteness value of 43.7 under the same conditions. Higher Hunter values mean lighter color.

EXAMPLE 18

A stabilized gasoline is prepared by incorporating into Texas cracked gasoline having no additives therein, 0.05% by weight of n-octadecyl β-(3,5-di-t-butyl-4-hydroxyphenyl)propionate.

Stabilized lard is prepared by incorporating in lard 0.01% by weight of n-octadecyl β-(3,5-di-t-butyl-4-hydroxyphenyl)propionate.

A stabilized high temperature aliphatic ester lubricating oil is prepared by incorporating 2% by weight of n-octadecyl β-(3,5-di-t-butyl-4-hydroxyphenyl)propionate into diisoamyladipate.

Heptaldehyde is stabilized by incorporating into the freshly distilled aldehyde 0.01% by weight of n-octadecyl β-(3,5-di-t-butyl-4-hydroxyphenyl)propionate.

Cyclohexene, freshly distilled, is stabilized by addition thereto of 0.001% by weight of n-octadecyl β-(3,5-di-t-butyl-4-hydroxyphenyl)propionate.

Paraffin wax is stabilized by incorporating therein 0.001% by weight of n-octadecyl β-(3,5-di-t-butyl-4-hydroxyphenyl)propionate.

In a similar manner stabilized compositions of the above substrates are prepared by incorporating therein, in place of the said n-octadecyl propionate compound, equal weights of 2-(n-octadecylthioethyl) 3-(3,5-di-t-butyl-hydroxybenzoate and tetra-[methylene 3-(3,5-di-t-butyl-4-hydroxyphenyl)-propionate]methane, respectively.

EXAMPLE 19

A stabilized polypropylene composition is prepared according to the procedure of Example 1 substituting for the 2-(n-octadecylthioethyl)-3,5,di-t - butyl - 4 - hydroxyphenylacetate an equal weight of n-octadecyl 3,5-di-t-butyl-4-hydroxyphenylacetate. A stabilized composition of matter with marked resistance to deterioration at high temperature is obtained.

EXAMPLE 20

A stabilized polypropylene composition is prepared according to the procedure of Example 1 substituting for the 2-(n-octadecylthioethyl)-3,5-di-t-butyl-4 - hydroxyphenylacetate an equal weight of 2-(n-octadecylthioethyl)-3,5-di-t-butyl-hydroxybenzoate. A stabilized composition of matter with marked resistance to deterioration at high temperature is obtained (oven life, 440 hours).

What is claimed is:
1. A stabilized composition of matter stabilized against deterioration which comprises organic material normally subject thereto and from about 0.005% to about 10% by weight of an esterified hindered phenol substituted acid stabilizer compound selected from the group consisting of those of the formulae:

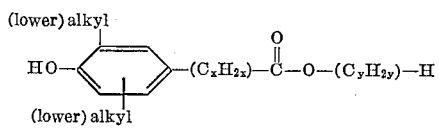

in which x has a value of from 0 to 6, inclusively, and
y has a value of from 6 to 30, inclusively;

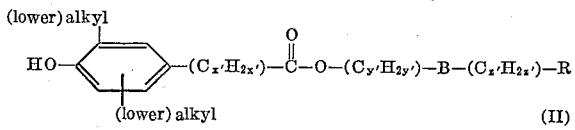

wherein x' has a value of from 0 to 6, inclusively,
each of y' and z' has a value of from 2 to 20, inclusively,
R is a member selected from the group consisting of hydrogen, hydroxy, alkanoyloxy, and

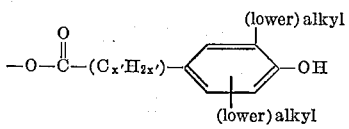

B is a member selected from the group consisting of a divalent sulfur atom, a divalent oxygen atom and the group

in which

A is alkyl or alkanoyl; and

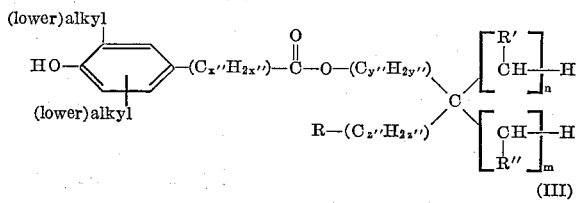

in which

R is selected from the group consisting of hydrogen, hydroxy, alkanoyloxy, and

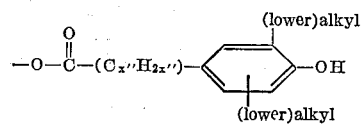

each of R' and R" is selected from the group consisting of hydroxy, alkanoyloxy, and

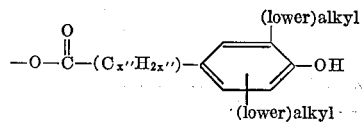

x" has a value of from 1 to 6 inclusively,
each of y", z", n and m independently has a value of from 0 to 6 inclusively, at least one of y", z", n and m having a value other than 0 and the sum of n and m being no greater than 6 and being at least 1 when R is hydrogen and the sum of y" and z" being at least 1 when R is other than hydrogen.

2. A stabilized composition of matter stabilized against deterioration which comprises organic material normally subject thereto and from about 0.005% to about 10% by weight of a stabilizer defined by Formula I in claim 1.

3. A stabilized composition of matter stabilized against deterioration which comprises organic material normally subject thereto and from about 0.005% to about 10% by weight of a stabilizer defined by Formula II in claim 1.

4. A stabilized composition of matter stabilized against deterioration which comprises organic material normally subject thereto and from about 0.005% to about 10% by weight of a stabilizer defined by Formula III in claim 1.

5. A composition of matter stabilized against deterioration which comprises organic material normally subject thereto, from about 0.005% to about 10% by weight of a stabilizer according to claim 1 and di-alkyl-β-thiodipropionate.

6. A stabilized composition of matter which comprises polypropylene and from about 0.005% to about 10% by weight of the stabilizer of claim 1.

7. A stabilized composition of matter which comprises mineral oil and from about 0.005% to about 10% by weight of the stabilizer of claim 1.

8. A stabilized composition of matter which comprises high impact polystyrene and from about 0.005% to about 10% by weight of the stabilizer of claim 1.

9. A stabilized composition of matter which comprises polypropylene and from about 0.005% to about 10% by weight of n-octadecyl 3,5-di-t-butyl - 4 - hydroxyphenylacetate.

10. A stabilized composition of matter which comprises polypropylene and from about 0.005% to about 10% by weight of n-octadecyl β-(3,5-di-t-butyl-4-hydroxyphenyl) propionate.

11. A stabilized composition of matter which comprises polypropylene and from about 0.005% to about 10% by weight of 2-(n-octadecylthioethyl)-3,5-di-t - butyl - 4 - hydroxyphenylacetate.

12. A stabilized composition of matter which comprises polypropylene and from about 0.005% to about 10% by weight of 2-(n-octadecylthioethyl)-3,5-di-t-butylhydroxybenzoate.

13. A stabilized composition of matter which comprises polypropylene and from about 0.005% to about 10% by weight of 2-(n-octadecylthioethyl)-3-(3,5-di - t - butyl-4-hydroxy)propionate.

14. A stabilized composition of matter which comprises polypropylene and from about 0.005% to about 10% by weight of tetra-[methylene 3-(3,5-di-t-butyl-4-hydroxyphenyl)propionate]methane.

15. A stabilized composition of matter which comprises polypropylene and from about 0.005% to about 10% by weight of ethyl 1,1,1-tris [methylene 3-(3,5-di-t-butyl-4-hydroxyphenyl)propionate].

References Cited by the Examiner
UNITED STATES PATENTS

| | | | |
|---|---|---|---|
| 2,624,752 | 1/1953 | Morris et al. | 252—48.6 |
| 2,809,164 | 10/1957 | Pruett | 252—52 |
| 2,954,345 | 9/1960 | Fibley | 252—52 |
| 3,026,264 | 3/1962 | Rocklin et al. | 252—52 |
| 3,033,814 | 5/1962 | Tholstrup | 260—45.85 |
| 3,112,338 | 11/1963 | Smutney et al. | 260—473 |
| 3,116,305 | 12/1963 | Morris et al. | 252—57 |
| 3,168,492 | 2/1965 | Doyle et al. | 260—45.85 |

DANIEL E. WYMAN, Primary Examiner.

P. E. KONOPKA, Assistant Examiner.